(12) United States Patent
Imamura et al.

(10) Patent No.: US 9,030,326 B2
(45) Date of Patent: May 12, 2015

(54) ELECTRONIC APPARATUS AND OPERATION CONTROL METHOD

(71) Applicant: Kabushiki Kaisha Toshiba, Tokyo (JP)

(72) Inventors: Akira Imamura, Hamura (JP); Ryuhei Yokota, Tachikawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 16 days.

(21) Appl. No.: 13/926,079

(22) Filed: Jun. 25, 2013

(65) Prior Publication Data
US 2014/0097956 A1 Apr. 10, 2014

(30) Foreign Application Priority Data

Oct. 10, 2012 (JP) ................................. 2012-224933

(51) Int. Cl.
*G08B 23/00* (2006.01)
*G08B 21/22* (2006.01)
*G09G 5/00* (2006.01)
*G06F 21/32* (2013.01)

(52) U.S. Cl.
CPC ........ *G08B 21/22* (2013.01); *G09G 5/00* (2013.01); *G06F 21/32* (2013.01); *G06F 2221/2111* (2013.01); *G09G 2330/027* (2013.01); *G09G 2354/00* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,107,938 | A * | 8/2000 | Du et al. ..................... | 340/12.22 |
| 6,559,777 | B1 * | 5/2003 | Martin et al. ................. | 340/981 |
| 2013/0049927 | A1 * | 2/2013 | Ichimori ....................... | 340/4.3 |

FOREIGN PATENT DOCUMENTS

| | | |
|---|---|---|
| JP | 2001-194232 A | 7/2001 |
| JP | 2011-029091 A | 2/2011 |

* cited by examiner

*Primary Examiner* — Travis Hunnings
(74) *Attorney, Agent, or Firm* — Knobbe, Martens, Olson & Bear LLP

(57) ABSTRACT

According to one embodiment, an electronic apparatus includes a housing, a display on a surface of the housing, an infrared sensor in a first region of the surface of the housing, the first region facing one side of the display, an indicator in the first region and configured to emit light, a first controller, and a second controller. The first controller turns on and off the display in accordance with a detection output of the infrared sensor. The second controller is configured to blink the indicator in a first blinking pattern in which a ratio of an ON time to a blinking cycle is smaller than that of an OFF time to the blinking cycle, when an event of which a user is notified occurs.

10 Claims, 7 Drawing Sheets

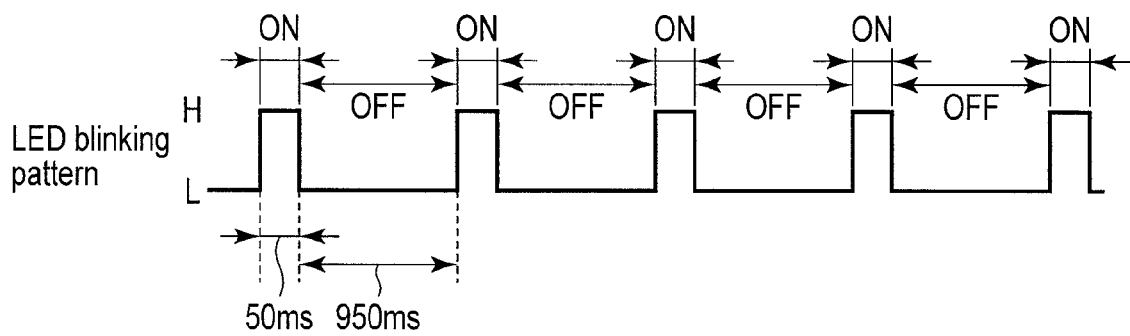
F I G. 4
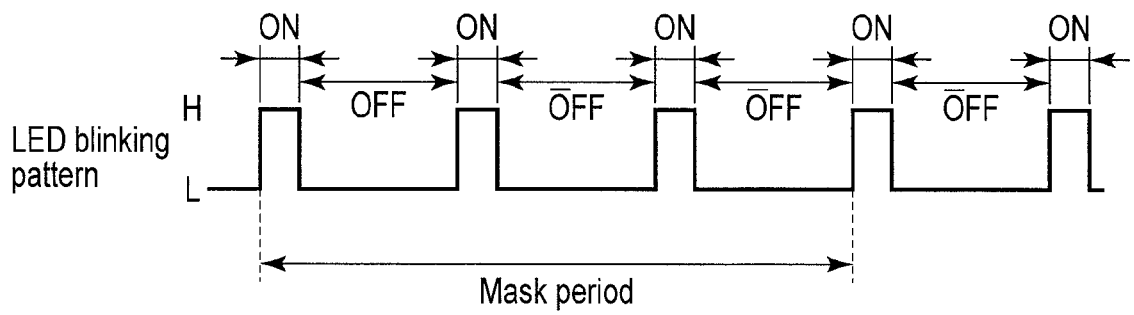
F I G. 5

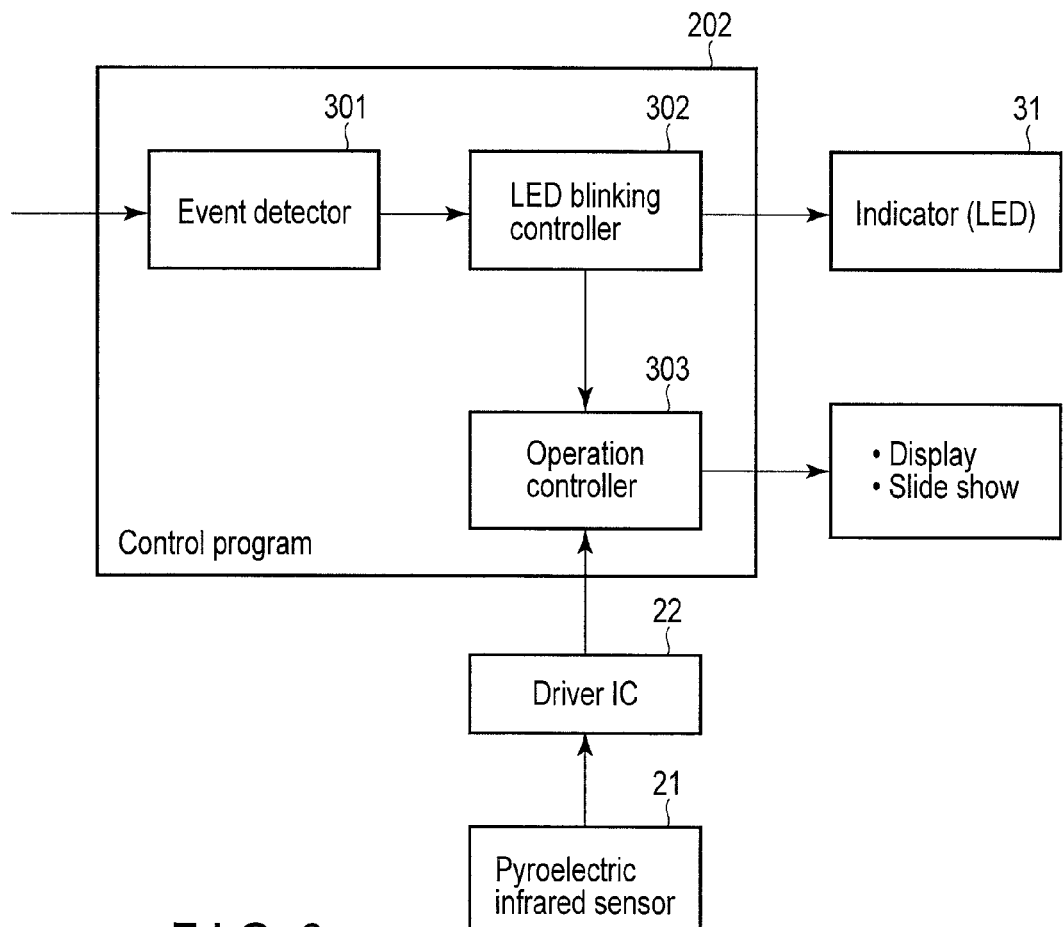
F I G. 6

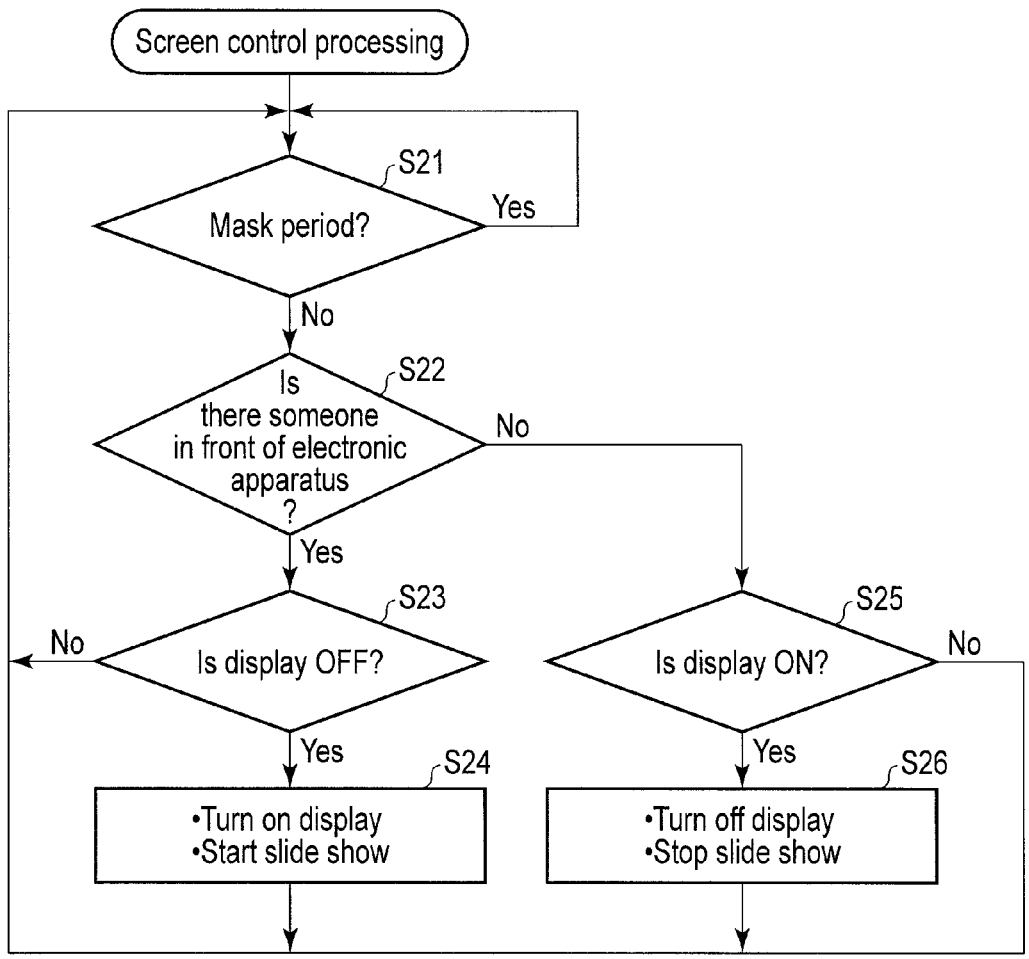
F I G. 10

ELECTRONIC APPARATUS AND OPERATION CONTROL METHOD

CROSS-REFERENCE TO RELATED APPLICATIONS

This application is based upon and claims the benefit of priority from Japanese Patent Application No. 2012-224933, filed Oct. 10, 2012, the entire contents of which are incorporated herein by reference.

FIELD

Embodiments described herein relate generally to an electronic apparatus and an operation control method used by the apparatus.

BACKGROUND

There is conventionally known a sensor (human sensor) for detecting the existence of a human body using an infrared sensor. The human sensor is used for an automatic light switch and the like.

If, however, such a human sensor is influenced by infrared radiation from surrounding heat sources such as a light emitter and electronic components, it may malfunction. As a method of reducing the influence of infrared radiation from a surrounding heat source, a partition for shutting off the infrared radiation from the heat source is arranged between the human sensor and the heat source.

However, in order to provide the partition, a sufficiently wide space is required between the human sensor and the heat source. In the case of a small-sized device or where there is a requirement of design, such a wide space may be hard to provide. In addition, the partition inevitably results in an increase in the number of parts required.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 4 is an exemplary view showing the blinking pattern of an LED provided in the electronic apparatus according to the embodiment;

FIG. 5 is an exemplary view showing the relationship between the blinking pattern of the LED provided in the electronic apparatus of the embodiment and a mask period during which the detection output of a human sensor is ignored;

FIG. 6 is an exemplary block diagram showing the structure of a control program used in the electronic apparatus according to the embodiment;

FIG. 10 is an exemplary flowchart illustrating the procedure of operation control processing executed by the electronic apparatus according to the embodiment.

DETAILED DESCRIPTION

Various embodiments will be described hereinafter with reference to the accompanying drawings.

In general, according to one embodiment, an electronic apparatus includes a housing, a display on a surface of the housing, an infrared sensor in a first region of the surface of the housing, the first region facing one side of the display, an indicator in the first region and configured to emit light, a first controller, and a second controller. The first controller controls to turn on and off the display in accordance with a detection output of the infrared sensor. The second controller is configured to blink the indicator in a first blinking pattern in which a ratio of an ON time to a blinking cycle is smaller than that of an OFF time to the blinking cycle, when an event of which a user is notified occurs.

Figure 1:
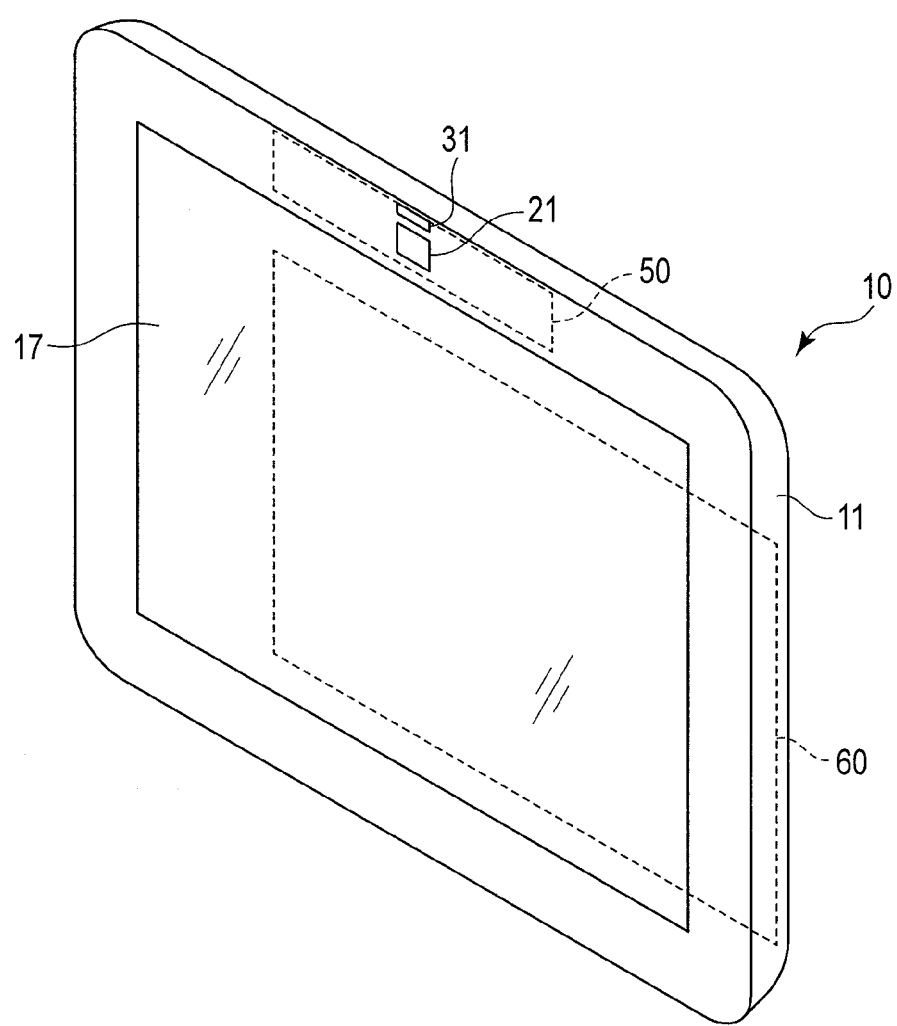
FIG. 1 is an exemplary perspective view showing the outer appearance of an electronic apparatus according to an embodiment.

FIG. 1 is a perspective view showing the outer appearance of an electronic apparatus 10 according to the embodiment. The electronic apparatus 10 is a small electronic apparatus capable of presenting various kinds of information to the user, and is implemented as, for example, an image display apparatus called a photo panel, a photo frame, or the like. In this case, the electronic apparatus 10 is placed on a desk or the like to be used.

The electronic apparatus 10 can display images corresponding to various digital contents such as moving images and still images like photos on a display. The electronic apparatus 10 can also sequentially play back digital contents such as photos in a slide show fashion. Furthermore, the electronic apparatus 10 has a wireless communication function such as a mobile wireless communication function, thereby enabling to receive email, other various kinds of messages, and the like.

As shown in FIG. 1, the electronic apparatus 10 includes a main body 11. The main body 11 has a thin, box-shaped housing. A main board (mother board) 60 on which various electronic components are arranged, a battery, and the like are provided in the housing of the main body 11.

The main board 60 is a printed circuit board (PCB). A display 17 is arranged on one surface of the housing, for example, the upper surface of the housing. The display 17 is arranged at almost the central position of the upper surface of the housing. The display 17 can be implemented by a flat panel display such as a liquid crystal display (LCD). Note that the display 17 may be implemented as a touch screen capable of detecting a touch position on it.

The electronic apparatus 10 also includes an infrared sensor 21 for detecting a human body so that its own operation can be automatically controlled according to a human body detection result. The infrared sensor 21 is arranged on the upper surface of the housing, more specifically, a first region of the upper surface of the housing. The first region of the upper surface is a region which faces one side of the display 17. FIG. 1 shows a case in which the infrared sensor 21 is arranged in a region above the upper side of the display 17. A pyroelectric infrared sensor can be used as the infrared sensor 21.

The infrared transmittance of a normal plastic material used as the material of this housing is not high enough. A human sensor window made by a white translucent plastic material having a high transmittance is arranged on the upper surface of the housing, and the infrared sensor (pyroelectric infrared sensor) 21 is arranged below the human sensor window.

The detection output of the pyroelectric infrared sensor 21 can be used to, for example, automatically turn on or off the display 17. This allows to automatically turn off the display 17 when there is no one in front of the electronic apparatus 10, thereby reducing unnecessary power consumption. If a person comes in front of the electronic apparatus 10, the display 17 is automatically turned on, and a content playback operation such as a slide show operation is automatically restarted.

Furthermore, an indicator 31 for emitting light is also arranged on the upper surface of the housing. The indicator 31 can be implemented by one or more LEDs. The indicator 31 is also arranged in the above-described first region together with the pyroelectric infrared sensor 21.

The indicator 31 is a light emitter used to notify the user of various kinds of information (event occurrence). For example, the indicator 31 notifies the user of events such as (1) reception of photo-mail, (2) charging of the battery, and (3) reception of early warning area mail. The photo-mail indicates email attached with a photo. A photo within received email can be used as a digital content described above, and can be played back by the electronic apparatus 10. The indicator 31 blinks, for example, in green upon receiving photo-mail, and blinks, for example, in orange upon receiving early warning area mail.

As described above, the human sensor window is formed using a material different from the plastic material of the upper surface of the housing. This enables the user to visually perceive the position of the human sensor window, that is, the position of the pyroelectric infrared sensor 21 used as a human sensor. Furthermore, the indicator (LED) 31 is required to be arranged at a position where the user can visually perceive it easily so as to readily recognize various kinds of information.

In this embodiment, to meet the requirements for the design that the two objects, that is, the pyroelectric infrared sensor 21 and the indicator (LED) 31 which can be seen by the user are arranged at positions where he/she can visually perceive them easily, the two objects are arranged in the above-described first region (the upper region of the upper surface of the housing) positioned above the display 17, as shown in FIG. 1. More specifically, the pyroelectric infrared sensor 21 and the indicator (LED) 31 are vertically aligned at the central position of the upper region of the upper surface of the housing. That is, on the upper surface of the housing, the pyroelectric infrared sensor 21 is arranged above the central position of the upper side of the display 17, and the indicator (LED) 31 is arranged above the pyroelectric infrared sensor 21. Aligning the pyroelectric infrared sensor 21 and indicator (LED) 31 at the central position of the upper region of the upper surface of the housing enables the user to readily recognize that the electronic apparatus 10 has a human sensor function, and to readily recognize by the indicator (LED) 31 that, for example, an event such as reception of new mail has occurred.

The upper portion of the upper surface of the housing corresponds to one side of the housing portion (a so-called frame unit) around the display 17. In general, excessively widening the width of the frame unit is not desirable in by a small electronic apparatus including a display in terms of the design, and a smaller width of the frame unit is preferable. In this embodiment, since the pyroelectric infrared sensor 21 and indicator (LED) 31 are arranged in the same region (upper region) of the frame unit of the upper surface of the housing, the indicator (LED) 31 is positioned very close to the pyroelectric infrared sensor 21. The arrangement in which the pyroelectric infrared sensor 21 and indicator (LED) 31 are arranged very close to each other on the upper surface of the housing can not only meet the requirements for the design but also decrease the number of components. That is, in this embodiment, the pyroelectric infrared sensor 21 and indicator (LED) 31 are mounted on a single sub board (daughterboard) 50. On the sub board 50, the spacing between the indicator (LED) 31 and the pyroelectric infrared sensor 21 is set to, for example, about 2 mm.

The sub board (daughterboard) 50 is electrically coupled to the above-described main board 60. The sub board (daughterboard) 50 is implemented by a printed circuit board (PCB) with a size smaller than that of the main board 60. The sub board 50 is a printed circuit board (PCB) provided in the housing to face the above-described upper region of the upper surface of the housing.

The main board 60 (system board) is, for example, arranged in the housing to face the rear surface of the display panel of the display 17. The main board 60, therefore, is positioned near the bottom surface of the housing, and is relatively far from the upper surface of the housing. If the pyroelectric infrared sensor 21 and indicator (LED) 31 are mounted on the main board 60, it becomes difficult to arrange the pyroelectric infrared sensor 21 and indicator (LED) 31 on the upper surface of the housing. In this embodiment, as described above, the sub board 50 different from the main board 60 is prepared, and the pyroelectric infrared sensor 21 and indicator (LED) 31 are arranged on the sub board (daughterboard) 50. It is, therefore, possible to readily arrange the pyroelectric infrared sensor 21 and indicator (LED) 31 on the upper surface of the housing. Arranging the pyroelectric infrared sensor 21 and indicator (LED) 31 on the single sub board (daughterboard) 50 enables to decrease the component cost.

Although it is possible to arrange the pyroelectric infrared sensor 21 and indicator (LED) 31 on the upper portion and lower portion of the upper surface of the housing, respectively, this requires two sub boards, that is, a sub board for the pyroelectric infrared sensor 21 and that for the indicator (LED) 31, thereby increasing the component cost.

Figure 2:
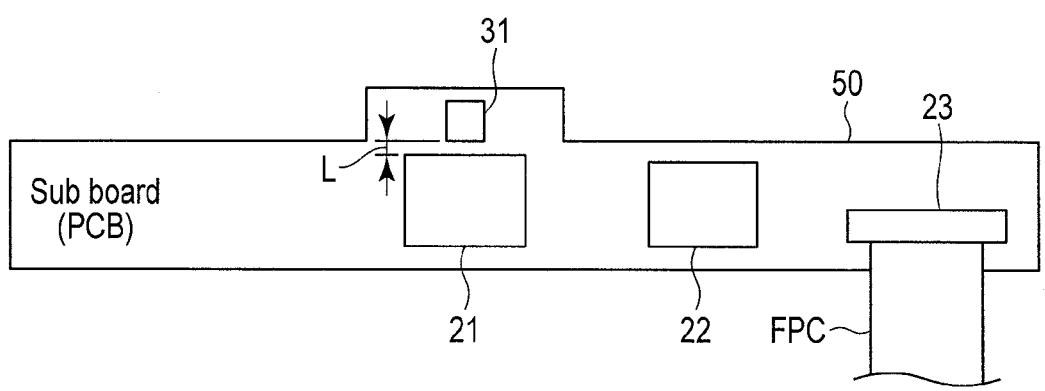
FIG. 2 is an exemplary view showing the arrangement of a sub board provided in the electronic apparatus according to the embodiment.

FIG. 2 shows the arrangement of the sub board 50.

The sub board 50 includes the pyroelectric infrared sensor 21, the indicator (LED) 31, a driver IC 22, and a connector 23. A distance L between the pyroelectric infrared sensor 21 and the indicator (LED) 31 is about 2 mm, as described above. A condenser lens is arranged on the light-receiving element surface of the pyroelectric infrared sensor 21.

In a human sensor using the pyroelectric infrared sensor 21, an analog output signal from the pyroelectric infrared sensor 21 changes according to a change amount (derivative) of an infrared ray incident on the pyroelectric infrared sensor 21, and it is detected that there is someone around the sensor when the value exceeds a threshold. The driver IC 22 is an IC for driving the infrared sensor 21, and outputs a detection signal (digital signal), for example, a signal with logical value "1", indicating that there is someone, if the change amount of the analog output signal from the pyroelectric infrared sensor 21 exceeds the threshold. The connector 23 is electrically coupled to the main board 60 via a conductive member like a flexible printed circuit (FPC).

Figure 3:
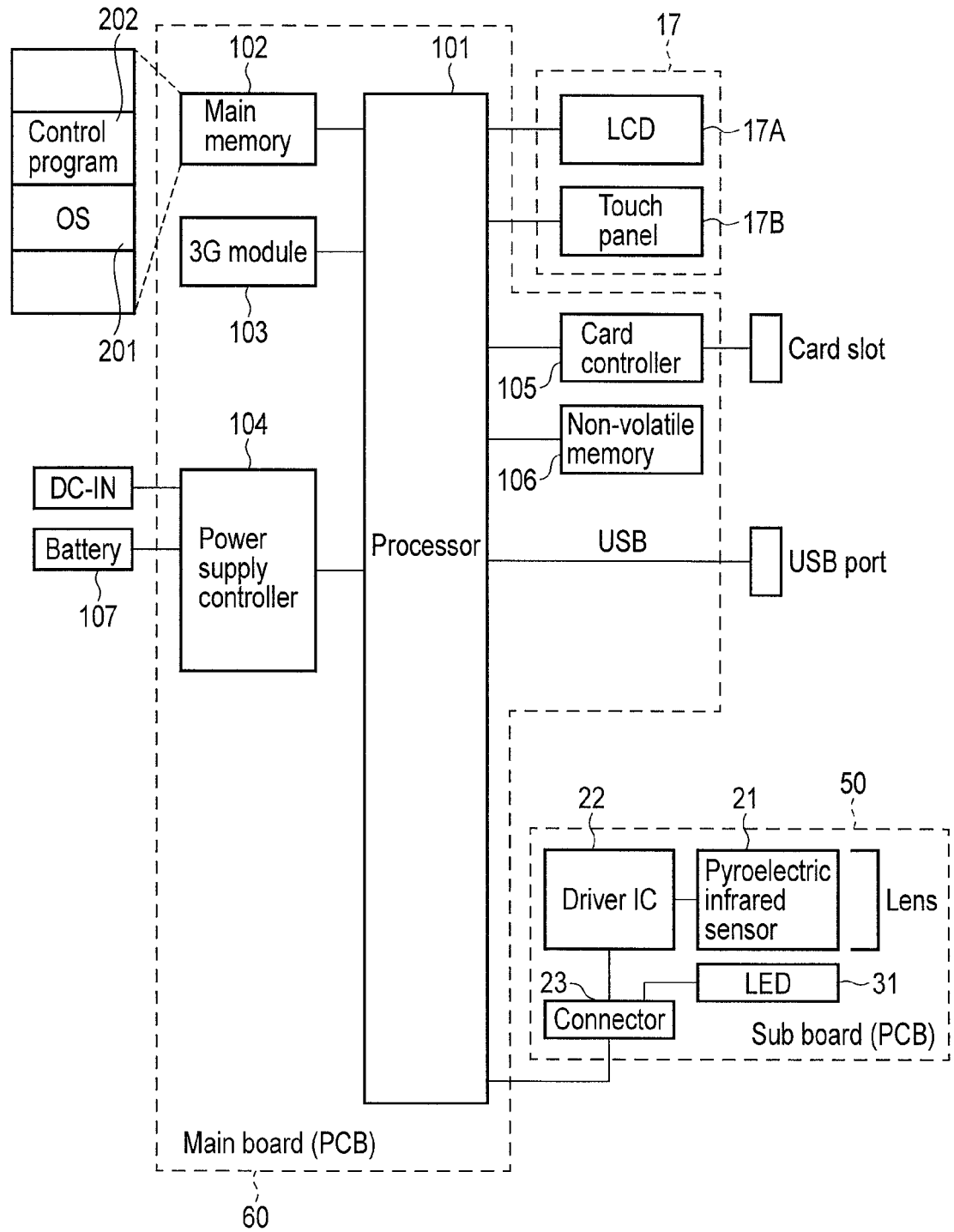
FIG. 3 is an exemplary block diagram showing the system configuration of the electronic apparatus according to the embodiment.

FIG. 3 shows the system configuration of the electronic apparatus 10. In addition to the above-described display 17 and sub board 50, the electronic apparatus 10 includes a processor 101, a main memory 102, a mobile communication (3G) module 103, a power supply controller 104, a card controller 105, a non-volatile memory 106, and a battery 107. The processor 101, main memory 102, mobile communication (3G) module 103, power supply controller 104, card controller 105, and non-volatile memory 106 are arranged on the above-described main board 60.

The processor 101 controls each component of the electronic apparatus 10. The processor 101 executes various software programs loaded from the non-volatile memory 106 into the main memory 102. The software programs include an operating system (OS) 201, a control program 202, and other various application programs. The control program 202 is a program executed on the operating system (OS) 201, and performs processing of using the indicator (LED) 31 to notify the user of the occurrence of an event such as mail reception and processing of controlling the operation of the electronic apparatus 10 such as an operation of automatically turning on/off the display 17 according to the detection result of the pyroelectric infrared sensor 21. The application programs include a player application program for sequentially playing back a slide show of images such as photos.

The mobile communication (3G) module 103 wirelessly communicates with a base station within a mobile communication network. The power supply controller 104 generates operational power to be supplied to respective components using electric power supplied from the battery 107 or that supplied from an external power supply through an external power supply terminal (DC-IN). The card controller 105 accesses a memory card inserted to a card slot provided in the main body 11 of the electronic apparatus 10. The display 17 may be implemented by a touch screen display functioning as the above-described touch screen. In this case, the display 17 includes an LCD 17A and a touch panel 17B arranged on the LCD 17A.

The sub board 50 is connected to several general-purpose IO ports (GPIOs) of the processor 101 via the above-described FPC. The processor 101 can supply an LED control signal to the indicator (LED) 31 via one or more given GPIOs, and receive the detection signal of the human sensor from the driver IC 22 via one or more other GPIOs. Each program on the OS 201 can use the detection signal of the human sensor.

As described above, the pyroelectric infrared sensor 21 is an IC for outputting an analog output signal corresponding to the change amount (derivative) of the received infrared ray, and the indicator (LED) 31 is arranged near the infrared sensor 21, for example, at a distance of 2 mm from the infrared sensor 21. Upon start of or during blinking of the indicator (LED) 31, the temperature of the LED and that of a current limiting resistor within the LED driving circuit may change, and infrared radiation from the current limiting resistor within the LED driving circuit and the indicator (LED) 31 to the infrared sensor 21 may accordingly vary. In this case, the infrared sensor 21 may erroneously react to the change in infrared radiation from the current limiting resistor within the LED driving circuit and the indicator (LED) 31, thereby making it impossible to correctly execute a control operation according to a human body detection result.

To correctly execute a control operation according to a human body detection result, that is, to suppress the erroneous reaction of the infrared sensor 21 or the human sensor, blinking of the indicator (LED) 31 is controlled using an LED blinking pattern shown in FIG. 4 in this embodiment. That is, the indicator (LED) 31 is controlled to blink in a blinking pattern in which the ratio of an ON time to a blinking cycle is smaller than that of an OFF time to the blinking cycle so that the fluctuation range of the temperature of the LED upon start of or during blinking falls within a range in which the infrared sensor 21 is not influenced. In this case, the duty ratio indicating the ratio of the ON time to the blinking cycle is set to, for example, a value smaller than 50%.

FIG. 4 shows a case in which the blinking frequency is 1 Hz (blinking cycle=1 sec), and the duty ratio indicating the ratio of the ON time to the blinking cycle is 5%. In this case, the ON time is set to 50 msec and the OFF time is set to 950 msec. By setting the duty ratio to a value smaller than 50% in each blinking cycle, the range of an increase in temperature of each of the LED and the current limiting resistor when the LED is turned on can be made small. Since it is, therefore, possible to suppress the fluctuation range of the infrared radiation from the indicator (LED) 31 to the infrared sensor 21 to be small, the above-described control operation of blinking the indicator (LED) 31 at the duty ratio smaller than 50% is effective to correctly execute a control operation according to a human body detection result.

FIG. 4 shows the blinking pattern in which the ON time is 50 msec and the OFF time is 950 msec. T blink the indicator (LED) 31 at a relatively low speed, however, the blinking cycle may be set to be longer than 1 sec. For example, a blinking pattern in which the ON time is 50 msec and the OFF time is 1000 msec, or that in which the ON time is 50 msec and the OFF time is 2000 msec can be used. In these cases, the duty ratio is smaller than 5%.

The erroneous reaction of the human sensor tends to occur upon start of blinking of the LED. This is because the range of an increase in temperature of each of the LED and the current limiting resistor is large during a given period after blinking of the LED starts. Note that after the given period elapses since blinking of the LED starts, the temperature of each of the LED and the current limiting resistor reaches an equilibrium to some extent (that is, converges around a given temperature), and the temperature increase range becomes small.

Therefore, not only blinking the indicator (LED) 31 in a blinking pattern with a duty ratio of 5% but an insensitive time (mask period) for disabling the detection output of the infrared sensor (human sensor) may be set upon start of blinking of the indicator (LED) 31, as shown in FIG. 5, and a control operation of disabling the detection output of the pyroelectric infrared sensor 21 during a period (the mask period) from when blinking of the indicator (LED) 31 starts until a predetermined period elapses may be executed.

The period during which the temperature increase range of the indicator (LED) 31 is large corresponds to first three to five blinking cycles. In consideration of the practical blinking frequency range (0.5 to ten-odd Hz), the mask period preferably falls within the range from 100 msec to 10 sec.

By executing the control operation of disabling the detection output of the pyroelectric infrared sensor 21 during the period from when blinking of the indicator (LED) 31 starts until the predetermined period elapses, it is possible to more reliably suppress the erroneous reaction of the infrared sensor 21 or the human sensor.

FIG. 6 shows an example of the functional structure of the control program 202.

The control program 202 includes, as its function execution modules, an event detector 301, an LED blinking controller 302, and an operation controller 303.

The event detector 301 detects the occurrence of an event of which the user should be notified. For example, the event detector 301 detects, as an event of which the user should be notified, reception of photo-mail, reception of early warning area mail, and the like. In response to detection of the occurrence of an event by the event detector 301, the LED blinking controller 302 starts controlling to blink the indicator (LED) 31. In this case, to suppress the erroneous reaction of the pyroelectric infrared sensor 21, that is, the occurrence of LED interference, due to a variation in infrared radiation from the indicator (LED) 31, the LED blinking controller 302 controls the indicator (LED) 31 to blink in a blinking pattern in which the ratio of an ON time to a blinking cycle is shorter than that of an OFF time to the blinking cycle. For example, the indicator (LED) 31 is blinked in the blinking pattern whose duty ratio is 5%.

Furthermore, to set the above-described mask period as needed, the LED blinking controller 302 executes processing for disabling the detection output of the pyroelectric infrared sensor 21 upon start of blinking of the indicator (LED) 31. In this case, the LED blinking controller 302 may instruct the operation controller 303 to mask (ignore) the detection signal of the human sensor so that the operation controller 303 does not react to the detection output of the pyroelectric infrared sensor 21 or the human sensor. If the operation controller 303 is configured to receive an interrupt signal from the human sensor, the LED blinking controller 302 may instruct the operation controller 303 not to react to the interrupt signal. To prevent the detection output of the human sensor from being sent to the processor 101 during a given period after blinking of the LED starts, the LED blinking controller 302 may stop the operation of the pyroelectric infrared sensor 21 or driver IC 22. For example, by setting a signal supplied to the enable pin of the driver IC 22 to a disable state to stop the operation of the driver IC 22, it is possible to prevent the detection output of the human sensor from being sent to the processor 101.

The operation controller 303 receives the detection output of the pyroelectric infrared sensor 21 or the human sensor via the driver IC 22, and controls the operation of the electronic apparatus 10 according to the detection output. For example, the operation controller 303 executes processing of turning on or off the display 17 in accordance with the detection output of the pyroelectric infrared sensor 21 or the human sensor. In this case, when the existence of a human body is detected, the display 17 is automatically turned on. If the existence of the human body is no longer detected, or a given period elapses after the existence of the human body is no longer detected, the display 17 is automatically turned off. Automatically controlling to turn on/off the display using the human sensor can efficiently reduce the power consumption of the electronic apparatus 10.

Furthermore, if the existence of the human body is no longer detected, or a given period elapses after the existence of the human body is no longer detected, the operation controller 303 may temporarily stop a slide show currently executed by the above-described player application program, and cause the player application program to restart execution of the slide show when the existence of a human body is detected.

The function (human sensor function) of detecting a human body using the pyroelectric infrared sensor 21 may be configured to be enabled or disabled, as needed. In this case, the control program 202 can display a setting menu screen for the pyroelectric infrared sensor 21 (human sensor). On the setting menu screen, "human sensor ON", "human sensor OFF", "operation in absence of user", and the like can be displayed.

When the user selects "human sensor ON", the function of detecting a human body using the pyroelectric infrared sensor 21 is enabled to execute processing of turning on/off the display 17 and like. When the user selects "human sensor OFF", the function of detecting a human body using the pyroelectric infrared sensor 21 is disabled. In this case, the detection output of the pyroelectric infrared sensor 21 is not used at all, and thus the pyroelectric infrared sensor 21 and driver IC 22 may be turned off. When the user selects "operation in absence of user", the control program 202 displays a setting screen for prompting the user to select an operation which should be executed in the absence of the user. On this setting screen, optional items such as "turn off display immediately", "turn off display after 1 min", and "turn off display after 2 min" are displayed. The user can designate an operation which should be executed in the absence of the user by selecting a desired optional item.

Figure 7:
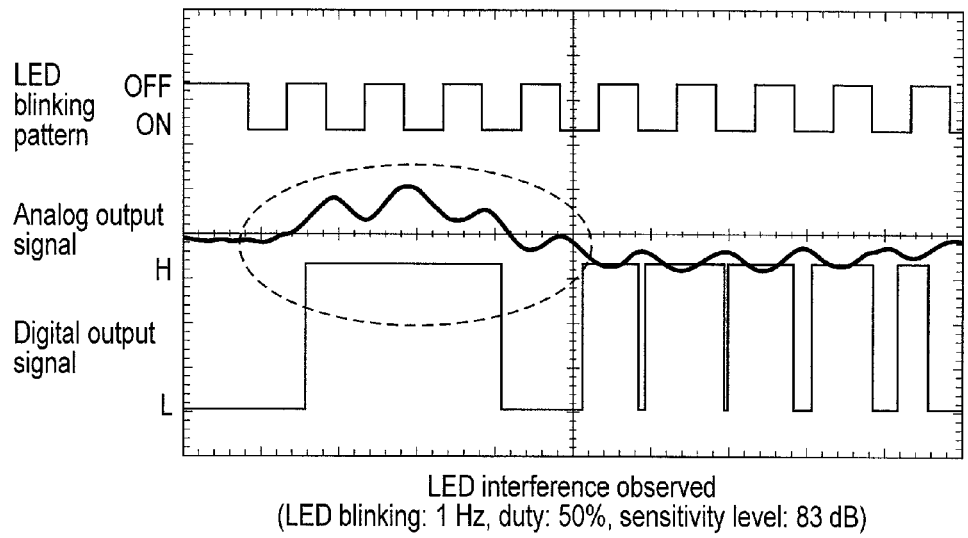
FIG. 7 is an exemplary view for explaining a case in which blinking of the LED causes a malfunction in the human sensor.

FIG. 7 shows a result of measuring the signal waveform of each of an LED blinking pattern, analog output signal, and digital output signal when LED interference occurs. In this example, the blinking frequency is set to 1 Hz, the duty ratio is set to 50%, and the sensitivity level of the human sensor is set to 83 dB. As described above, the analog output signal represents the detection output of the pyroelectric infrared sensor 21, and the digital output signal represents the detection output of the driver IC 22.

As will be apparent from FIG. 7, if the LED is blinked at a duty ratio of 50%, the analog output signal varies in a wide range. This is because upon start and during blinking of the LED, the temperatures of the LED and current limiting resistor change and the infrared radiation accordingly varies, as described above. Especially during a predetermined period (a period indicated by a broken line) after blinking starts, the fluctuation ranges of the temperatures of the LED and current limiting resistor are large, and thus, a variation in analog output signal is also large.

Figure 8:
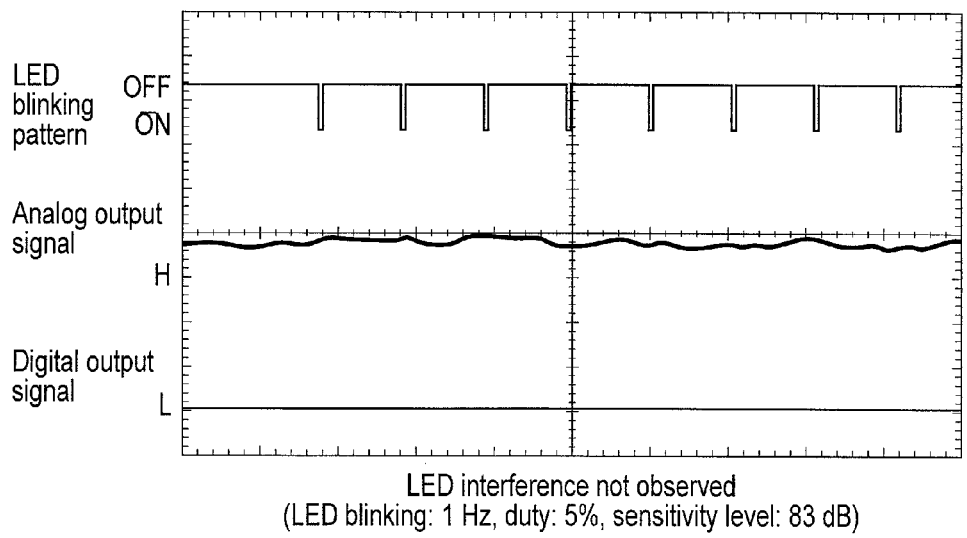
FIG. 8 is an exemplary view for explaining the relationship between the LED blinking pattern used and the detection output of the human sensor in the electronic apparatus of the embodiment.

FIG. 8 shows a result of measuring the signal waveform of each of the LED blinking pattern, analog output signal, and digital output signal when no LED interference occurs. In this example, the blinking frequency is set to 1 Hz, the duty ratio is set to 5%, and the sensitivity level of the human sensor is set to 83 dB.

As described above with reference to FIG. 7, if the LED is blinked at a duty ratio of 50%, the temperature of the LED repeatedly increases and decreases, and the variation range of the analog signal (the waveform of the received light) becomes large, thereby causing an erroneous reaction. As shown in FIG. 8, if the duty ratio is set to a value smaller than 50%, for example, 5%, an LED ON period within one blinking cycle becomes shorter, the temperature increase range of the LED during the LED ON period can be suppressed to be small, and the variation range of the analog signal (the waveform of the received light) can be made small, thereby enabling to suppress the occurrence of an erroneous reaction.

It is, therefore, possible to prevent a malfunction from occurring, in which even when there is no one in front of the electronic apparatus 10, the display 17 is erroneously turned on upon start of or during blinking of the indicator (LED) 31. Note that both processing of blinking the indicator (LED) 31 at, for example, a duty ratio of 5% and processing of setting the above-described mask period may be executed. This can more reliably suppress occurrence of an erroneous reaction.

Figure 9:
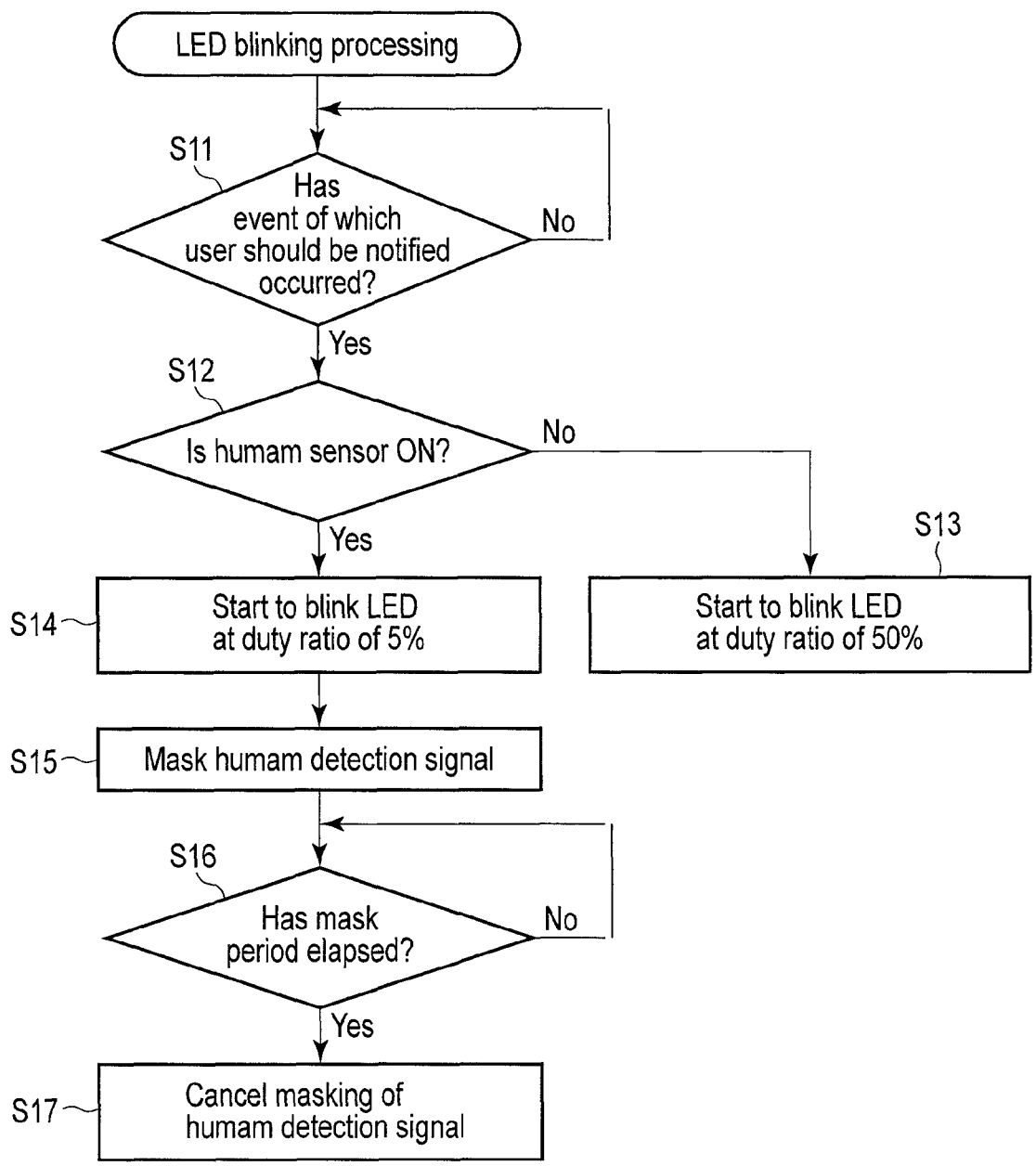
FIG. 9 is an exemplary flowchart illustrating the procedure of LED blinking processing executed by the electronic apparatus according to the embodiment.

The procedure of the LED blinking processing executed by the control program 202 will be described with reference to a flowchart shown in FIG. 9.

The control program 202 determines whether an event such as mail reception of which the user should be notified has occurred (step S11). If the occurrence of an event is detected (YES in step S11), the control program 202 determines whether the human sensor is ON, that is, whether the function of detecting a human body using the pyroelectric infrared sensor 21 has been enabled (step S12). If the human sensor is OFF, that is, the function of detecting a human body using the pyroelectric infrared sensor 21 has been disabled (NO in step S12), the control program 202 starts processing of blinking the indicator (LED) 31 in a blinking pattern with a duty ratio larger than the above-described duty ratio of 5%, for example, a duty ratio of 50% (step S13).

On the other hand, if the human sensor is ON, that is, the function of detecting a human body using the pyroelectric infrared sensor 21 has been enabled (YES in step S12), the control program 202 executes processing of starting blinking the indicator (LED) 31 at a duty ratio smaller than that when the human sensor is OFF, for example, a duty ratio of 5% (step S14). After that, the indicator (LED) 31 continuously blinks. While the indicator (LED) 31 blinks, the control program 202 executes the following processing.

Upon start of blinking of the indicator (LED) 31, the control program 202 executes processing of masking a human detection signal (step S15). In step S15, the control program 202 executes a control operation of disabling the detection output of the pyroelectric infrared sensor 21 during a predetermined period (the mask period) after blinking of the indicator (LED) 31 starts. As described above, for example, the control program 202 may instruct the operation controller 303 not to react to an interrupt signal from the human sensor, or may stop the operation of the human sensor, for example, the operation of the pyroelectric infrared sensor 21 or driver IC 22.

After that, the control program 202 determines whether the mask period has elapsed after blinking of the indicator (LED) 31 starts (step S16). If the mask period has elapsed after blinking starts (YES in step S16), the control program 202 cancels the masking of the human detection signal (step S17). In step S17, the control program 202 may notify the operation controller 303 of an instruction to react to an interrupt signal from the human sensor, or may restart the operation of the pyroelectric infrared sensor 21 or driver IC 22.

An example of the procedure of the operation control processing executed by the control program 202 will be described with reference to a flowchart shown in FIG. 10.

During the mask period while the detection output of the infrared sensor 21 should be disabled (YES in step S21), the control program 202 does not react to the detection output of the pyroelectric infrared sensor 21, that is, the digital signal of the human sensor. During a period other than the mask period, based on the detection output of the pyroelectric infrared sensor 21, that is, the digital signal of the human sensor, the control program 202 determines whether there is someone in front of the electronic apparatus 10 (step S22). If it is determined that there is someone in front of the electronic apparatus 10 (YES in step S22), for example, the control program 202 determines whether the display 17 is OFF (step S23). If the display 17 is OFF (YES in step S23), the control program 202 turns on the display 17, and also causes the player application program to start or restart a slide show (step S24).

If it is determined that there is no one in front of the electronic apparatus 10 (NO in step S22), for example, the control program 202 determines whether the display 17 is ON (step S25). If the display 17 is ON (YES in step S25), the control program 202 turns off the display 17, and also causes the player application program to stop or temporarily stop a slide show (step S26).

As described above, in this embodiment, the pyroelectric infrared sensor for detecting a human body is arranged in the first region of the surface of the housing, thereby enabling to automatically turn on/off the display according to the detection output of the pyroelectric infrared sensor. The indicator for emitting light is also arranged in the first region of the surface of the housing. When an event of which the user should be notified occurs, the indicator (LED) 31 is blinked in a blinking pattern in which the ratio of an ON time to a blinking cycle is smaller than that of an OFF time to the blinking cycle. This can make the fluctuation range of the temperature of the indicator (LED) 31 smaller than that when the indicator (LED) 31 is continuously turned on or is blinked at a duty ratio of 50%, thereby enabling to suppress the erroneous reaction of the pyroelectric infrared sensor 21 due to a variation in infrared radiation from the indicator (LED) 31. Even in the arrangement in which the indicator (LED) 31 is arranged near the pyroelectric infrared sensor 21, therefore, it is possible to execute a control operation according to a human body detection result without providing a special partition member between the pyroelectric infrared sensor 21 and the indicator (LED) 31.

In this embodiment, since the pyroelectric infrared sensor 21 and indicator (LED) 31 are mounted on the single sub board, it is possible to decrease the number of necessary components and reduce the component cost, as compared with a case in which the pyroelectric infrared sensor 21 and indicator (LED) 31 are individually arranged in different places.

Note that the control operation of executing both the processing of blinking the indicator (LED) 31 at, for example, a duty ratio of 5% and the processing of setting the above-described mask period has been exemplified in this embodiment. Only the processing of setting the mask period, however, may be individually executed. A variation in analog output signal of the pyroelectric infrared sensor 21 becomes particularly large immediately after blinking of the indicator (LED) 31 starts. Therefore, individually executing only the processing of setting the mask period without setting the duty ratio below a normal value can suppress the erroneous reaction of the pyroelectric infrared sensor 21, thereby enabling to execute a control operation according to a human body detection result.

By setting an ON time within one cycle to be short using a high blinking frequency instead of blinking the indicator (LED) 31 in a blinking pattern with a duty ratio smaller than 50%, it is also possible to shorten an LED ON period within one blinking cycle. If, for example, the blinking frequency is increased to 10 Hz to blink the indicator (LED) 31 at a duty ratio of 50%, an LED ON period within one blinking cycle becomes equal to an LED ON period of 50 msec when the indicator (LED) 31 is blinked with a blinking frequency of 1 Hz at a duty ratio of 5%. By increasing the blinking frequency to shorten an ON time within one cycle instead of blinking the indicator (LED) 31 in a blinking pattern with a duty ratio smaller than 50%, therefore, it is also possible to suppress the erroneous reaction of the pyroelectric infrared sensor 21, thereby enabling to execute a control operation according to a human body detection result.

Furthermore, a case in which the electronic apparatus 10 is implemented by a photo panel has been exemplified in this embodiment. In some small electronic apparatuses such as an external web camera and a wristwatch including both a human sensor and an LED, the necessity of arranging the components close to each other may be greater. Alternatively, since a function on/off control operation by the human sensor can readily implement a power-saving function, the electronic apparatus 10 can be implemented as a small module applied to various home electrical appliances.

Since a computer program can realize the control processing according to this embodiment, it is possible to readily obtain the same effects as those in the embodiment by only installing, through a computer-readable storage medium storing the computer program, the computer program into a computer in which the indicator (LED) 31 is arranged near the infrared sensor 21, and executing it.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus comprising:
    a housing;
    a display on a surface of the housing;
    an infrared sensor in a first region of the surface of the housing, and configured to detect a human body, the first region facing one side of the display;
    an indicator in the first region, and configured to emit light;
    a first controller configured to turn on and off the display in accordance with a detection output of the infrared sensor; and
    a second controller configured to blink the indicator in a first blinking pattern in which a ratio of an ON time to a blinking cycle is smaller than that of an OFF time to the blinking cycle, when an event to be notified occurs.

2. The apparatus of claim 1, further comprising
    a sub board in the housing, the sub board facing the first region, and electrically coupled to a main board comprising various electronic components,
    wherein the sub board comprises the infrared sensor and the indicator.

3. The apparatus of claim 1, wherein the ratio of the ON time to the blinking cycle is smaller than 50%.

4. The apparatus of claim 1, wherein the second controller is further configured to disable the detection output of the infrared sensor during a period from when blinking of the indicator starts until a first period elapses.

5. The apparatus of claim 1, wherein the second controller is further configured to blink the indicator in the first blinking pattern while a function of detecting a human body using the infrared sensor is enabled.

6. The apparatus of claim 1, wherein:
    the first controller is further configured to enable or disable a function of detecting the human body using the infrared sensor in accordance with a user operation, and
    the second controller is further configured to blink the indicator in the first blinking pattern if the function of detecting the human body using the infrared sensor is enabled.

7. The apparatus of claim 6, wherein the second controller is further configured to blink the indicator in a second blinking pattern in which a ratio of an ON time to a blinking cycle is larger than that of the first blinking pattern, when the function of detecting the human body using the infrared sensor is disabled.

8. The apparatus of claim 1, wherein the infrared sensor is a pyroelectric infrared sensor.

9. An operation control method for an electronic apparatus, the apparatus comprising a housing, a display on a surface of the housing, an infrared sensor in a first region of the surface of the housing and configured to detect a human body, and an indicator in the first region and configured to emit light, the first region facing one side of the display, the method comprising:
    controlling on and off of the display in accordance with a detection output of the infrared sensor; and
    blinking the indicator in a first blinking pattern in which a ratio of an ON time to a blinking cycle is smaller than that of an OFF time to the blinking cycle, when an event to be notified occurs.

10. A computer-readable, non-transitory storage medium comprising a computer program configured to be executed by a computer, the computer comprising a housing, a display on a surface of the housing, an infrared sensor in a first region of the surface of the housing and configured to detect a human body, and an indicator in the first region and configured to emit light, the first region facing one side of the display, the computer program controlling the computer to execute functions of:
    controlling on and off of the display in accordance with a detection output of the infrared sensor; and
    blinking the indicator in a first blinking pattern in which a ratio of an ON time to a blinking cycle is smaller than that of an OFF time to the blinking cycle, when an event to be notified occurs.

* * * * *